Feb. 23, 1937.   G. L. SMITH   2,072,014
AUTOMATIC BRAKE ADJUSTING MECHANISM
Filed Sept. 12, 1931
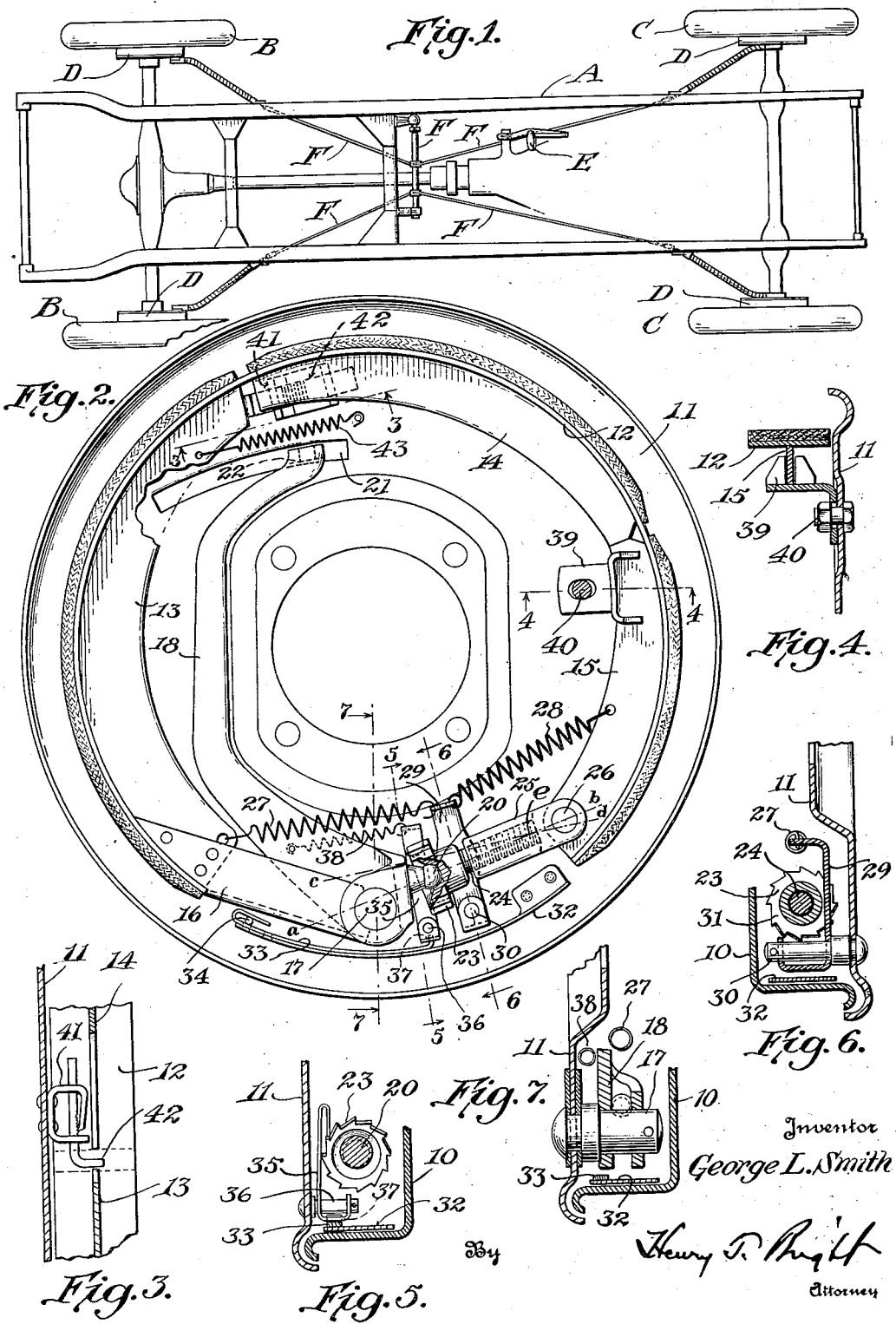
Inventor
George L. Smith
By
Henry T. Wright
Attorney Patented Feb. 23, 1937

2,072,014

UNITED STATES PATENT OFFICE 2,072,014

AUTOMATIC BRAKE ADJUSTING MECHANISM

George L. Smith, Rockford, Ill., assignor, by mesne assignments, to Thermo Brakes Corporation, Washington, D. C., a corporation of Virginia Application September 12, 1931, Serial No. 562,550

31 Claims. (Cl. 188—79.5)

My invention relates to automatic brake adjusting mechanism and has for its purpose the provision of a self-adjusting mechanism which will be controlled by the temperature of the brake in such a way that a rise in the temperature of the brake parts will delay the take up action of the mechanism.

When brakes embodying my invention are employed in plural brake automobile systems I accomplish the desirable result of causing the coolest brake of the system to adjust first, the coolest brake being the one doing the least amount of braking and therefore requiring a tightening adjustment before the others. Should all brakes be in adjustment, no take up action would occur as they would all heat up equally.

I believe I am the first to utilize variations in the temperature of automatically adjustable brakes to control their adjustment and it is therefore my intent to cover in the appended claims any automatically adjustable brake whose adjustment is controlled by means directly or indirectly responsive to its temperature.

In the drawing chosen to illustrate my invention

Figure 1 is a plan view of a four wheel brake system, the brakes thereof being in accordance with my invention;

Figure 2, a view in elevation of one of the brakes of Figure 1 with the brake drum removed and the parts shown in "brake on" position;

Figure 3, a section in line 3—3 of Fig. 2;

Figure 4, a section in line 4—4 of Fig. 2;

Figure 5, a section in line 5—5 of Fig. 2;

Figure 6, a section in line 6—6 of Fig. 2; and

Figure 7, a section in line 7—7 of Figure 2.

In the drawing A indicates the chassis frame of an automobile, B the rear wheels, C the front wheels and D the brakes associated respectively with the wheels B and C, said brakes being adapted to be simultaneously applied by a foot pedal E operating through connections F.

The construction of my improved brake mechanism is clearly shown in Figures 2 to 7 wherein 10 represents the brake drum and 11 the brake backing plate which carries the various brake parts. The band 12 is reinforced by the webs 13, 14, and 15 to form three stiff sectors thus reducing the self wrapping action. An extension piece 16 is riveted to the web 13 and is formed at its right end, Fig. 2, to bear against the anchor pin 17 which is riveted securely to the backing plate 11.

The brake expanding mechanism is composed of a lever 18 pivoted on the anchor pin. The lower or inner end of this lever is bent to form a double bearing on pin 17 with space between the two bearings thus formed permitting entry of the extension piece 16 so that said piece can bear directly against the rigid anchor pin 17. In this construction the lever is not required to carry any of the brake load. A ball stud 20 is riveted to the lever adjacent the anchor pin bearing and its upper end is bent over as at 22 to pass through the slot 21 in the backing plate. This lever is shown in the brake on position. The expanding link consists of a ratchet wheel 23 having a spherical bearing to engage the ball 20, a screw 24 fixed to the ratchet wheel and a sleeve 25 threaded on the screw 24 and pivotally secured to the web 15 by the pin 26. The ratchet wheel has the ball 20 located at its center so that the swinging movement of the ratchet wheel will be a maximum. Also with the ball so disposed with respect to the ratchet wheel the pressure of the ratchet pawl in turning the wheel will have no tendency to cant the sleeve 25. In such an arrangement inaccuracies in the shape of the various parts will have the least effect on the action of the expanding link. The brake release springs 27 and 28 keep the brake normally in released position and are hooked to lever 29 carried by the pivot 30. This lever bears against the adjacent end face 31 of ratchet wheel 23 and the spring 27 is made considerably stronger than spring 28. This holds the ratchet wheel securely on its ball pivot 20 while spring 28 being more flexible prevents a heavy frictional load on the screw which would resist turning movement and make the ratchet wheel work hard. Also the frictional resistance developed by the pressure of lever 29 on face 31 of ratchet wheel assists in its rotation as it swings back to its brake off position, so that the work required of spring 27 in operating the ratchet is reduced.

The ratchet operating device consists of a sector 32 which lies close to the brake drum in the gap between the ends of the band where it will heat up as rapidly as possible. This sector is made of a material having a greater coefficient of expansion than the material of which the other brake parts are made. A steel strip 33 is riveted to the sector 32 at its left end and is bent around to embrace the stud 34 carried by the backing plate, so that this end of the sector may expand and contract; while the right end of the sector is riveted to the backing plate. The right end of strip 33 is bent over to form a hook to engage a slot 37 in the ratchet pawl 35. This pawl pivots on the pin 36 and its free end is turned back to form a stop for engaging the ratchet teeth as shown in Figure 5. A spring 38 is hooked to this free end and constantly draws this end to the left.

It will be noted, when the brake is unapplied, that the pawl 35 is positioned at right angles to the line c—d and that the then operative face of a ratchet wheel tooth lies in a plane parallel to the line c—d. This relative relation between the pawl 35 and the ratchet wheel teeth, when the brake is unapplied, is an important feature of my invention, as in such relation movement of the pawl, due to heating of the sector 32, will not effect any rotation of the ratchet wheel. Were such movement of the pawl effective to cause rotation of the ratchet wheel the position of the next tooth to be picked up would vary with the temperature and not be constant unless the ratchet wheel backed off again when the parts cooled off, a movement that would never take place owing to the friction of the screw threads.

A steady rest 39 is secured to the backing plate 11 by a bolt 40, and as shown in Fig. 4, holds the band in proper relation to the drum at this point. Also an automatic clearance adjuster 42 is carried by a guide 41 riveted to the backing plate and controls the clearance of band adjacent the web 13. Contact with this adjuster is made by spring 43 while brake is unapplied.

The mechanism operates as follows:

In swinging the lever 18 to its off position the ball 20 moves counter-clockwise about anchor pivot 17 and brings the center line a—b of ratchet wheel 23, screw 24 and sleeve 25 to the position c—d (Figure 2). The distance between the center lines a—b and c—d at the point of contact of the pawl with the ratchet wheel, when the latter is in the position shown in Figure 2, is equal to the width of a ratchet tooth and it may be assumed that the ratchet wheel 23 swings during brake operation about a center e at the intersection of the lines a—b and c—d.

It will of course be understood that when the brake is in correct adjustment and at a very low temperature because of idleness over a long period, then the operation of the same to brake on and off positions will not effect any take up for the reason that the brake expanding toggle which includes the ratchet wheel will not move a sufficient distance in correctly applying the brake to cause the pawl to pick up another tooth.

Now assume the brake to be in need of adjustment and its temperature relatively low because of weak braking. Under such conditions the effective portion of the pawl 35 will be positioned as shown in Fig. 2 which position is at the limit of its movement in a counter-clockwise direction. In this position the point of contact of the pawl with the ratchet wheel is located a distance from the swinging center e where the ratchet wheel has a swinging movement the distance of one of its teeth. When the pawl 35 is in the aforesaid position, if the brake is operated from off to on the ratchet wheel will move downwardly and the pawl will engage a new tooth. Upon subsequent release of the brake the ratchet wheel will move upwardly and be turned by the pawl the distance of one tooth with resulting adjustment of the brake. It will be noted that the tooth engaging point of pawl 35 is limited in its movement towards the ratchet wheel (see Fig. 5), and therefore any excessive brake applying movement which would bring a second tooth of the ratchet wheel abreast this tooth engaging point after the latter had picked up the next tooth would not cause the second tooth to be engaged by the pawl inasmuch as such second tooth would be positioned beyond the engaging range of this point of the pawl. Such structure and relation of parts provides a positive means for restricting the adjustment of the brake for each adjustment activating brake application and release to small uniform increments measured by the width of one tooth regardless of the amount of brake applying movement of the ratchet wheel. Now assume that a strong and efficient braking action is exerted by the brake and that it is considerably heated due to its exerting a heavy braking torque. Under the latter conditions the operation of the brake will not produce any adjustment thereof. This is due to the fact that the heat of the brake expands the sector 32 and such expansion operates through the strip 33 to pivot the pawl 35 clockwise, so that the point of contact between the pawl and ratchet wheel is positioned nearer the swinging center e and the ratchet wheel will not move at said point of contact a distance sufficient to cause the pawl to pick up a new tooth and no adjustment of the brake will occur during the release thereof. Thus it is seen that the heating of the aluminum sector 32, which has a greater co-efficient of expansion than the other parts of the brake, causes a delay in the take up action of the brake. This accomplishes three desirable results when my brakes are incorporated in an automotive four wheel brake system, to wit:

1. The weakest brake is adjusted before the others to bring it up to its proper power.

2. The heating of all brakes alike retards the take-up action equally all around, so that the running clearance will not be seriously reduced as a result of drum expansion due to heat.

3. Adjustment will take place on all brakes of a system as long as heavy brake application does not cause them to heat up, so that a brake system badly out of adjustment will automatically adjust itself to cause all brakes to heat up uniformly thereby developing equal torque on all brakes.

With respect to the result of causing the weakest brake of a plural automotive brake system to be automatically adjusted before the other brakes of the system it is pointed out that such weakest brake will inherently be the one having the least braking torque and that this feature of the instant disclosure is broadly covered by my U. S. Patent 1,850,898, March 22, 1932.

I claim:

1. In combination, an automatically adjustable brake, and means responsive to the temperature of the brake controlling the adjustment thereof.

2. In combination, an automatically adjustable brake, and means responsive to a rise in the temperature of the brake to delay the adjustment thereof.

3. In a brake, a drum, an automatically adjustable braking member for engaging the drum, and means responsive to the temperature of the brake for controlling the adjustment of said member.

4. In a brake, a drum, an automatically adjustable braking member for engaging the drum, and means responsive to a rise in the temperature of the brake to delay the adjustment of the member.

5. In a brake mechanism, a brake drum, a braking member for engaging the drum, an automatic slack adjuster for the member, and means responsive to the temperature of the brake controlling the operation of the slack adjuster.

6. In a brake mechanism, a brake drum, a braking member for engaging the drum, an automatic slack adjuster for the member, and means responsive to a rise in temperature of the brake to delay the operation of the slack adjuster.

7. In a brake, a braking member, an expanding toggle mechanism for the braking member including a ratchet wheel carried by one arm of the toggle mechanism, a ratchet pawl carried by a relatively fixed part, thermostatic means controlling the position of said pawl with respect to said ratchet wheel, and means operated by the rotation of said ratchet wheel to adjust the braking member.

8. A slack adjusting mechanism for brakes comprising a swinging ratchet wheel, means for rotating said wheel one ratchet tooth as it swings, and a lever exerting an off center pressure on said wheel whereby the frictional force developed by said pressure assists in the rotation of said wheel as it swings.

9. In a brake mechanism, a brake drum, a brake band expansible within the drum, brake expanding mechanism for said band, a slack adjuster included in said expanding mechanism, a pawl for operating said slack adjuster and a sector controlling the position of said pawl located between the ends of said band and in close proximity to said drum, said sector having a different co-efficient of expansion from that of the other adjacent brake parts.

10. In an automotive brake system, a plurality of automatically adjustable brakes, and thermostatic means associated with each brake controlling the adjustment thereof.

11. In an automotive brake system, a plurality of automatically adjustable brakes, and means associated with each brake operated by a rise in the temperature of the brake to delay the adjustment thereof.

12. In an automotive brake system, a plurality of brake drums, braking members associated with respective drums for retarding their rotary movement, slack adjusters associated respectively with the braking members, and means individual to each brake for automatically operating said slack adjusters, said means including heat controlled elements effecting equal delay in the operation of respective slack adjusters for equal heating of respective brake drums.

13. In an automotive brake system, a plurality of brakes, each comprising a brake drum and a braking member having predetermined running clearance with its drum, a slack adjuster for automatically adjusting the brake member, and means maintaining said running clearance substantially constant regardless of the expansion of brake parts due to heat resulting from brake application.

14. In a brake, a braking element, brake applying mechanism including an adjustable connecting member for adjusting said element, said member having a brake applying movement from a fixed initial position, and means engaging said member movable to vary the adjusting effect of said member on said element, the movement of said means producing no adjusting movement of said member when in its fixed initial position.

15. In a brake, a braking element, brake applying mechanism including an adjustable connecting member for adjusting said element, said member having a brake applying movement, and means effecting operating engagement with said member after a predetermined brake applying movement, said means being movable to increase or decrease the length of said predetermined movement required to effect such engagement.

16. A brake comprising a drum, friction means, actuating means for moving said friction means into engagement with said drum, automatic adjusting means for said friction means operable to compensate for wear of said friction means, and thermostatic means for discontinuing the operation of the automatic adjusting means during temperature rises in said drum.

17. A brake comprising friction means having separable ends, actuating means to separate the ends, adjusting means for lengthening said friction means, mechanism for actuating said adjusting means upon a predetermined brake release movement of the adjusting means, and thermo sensitive means associated with said mechanism located adjacent the drum for suspending the operation of said mechanism during rises of drum temperature.

18. A brake comprising a drum, a friction device, an automatic clearance adjusting mechanism for said friction device and drum and means responsive to heat of the brake to prevent adjustment for clearance due to drum heat expansion.

19. A brake comprising a drum, a friction device, an adjustment screw therefor, means to rotate said screw upon movement of said friction device in excess of a predetermined movement from engagement with said drum to disengaged position, and thermostatic means to render said rotating means inoperative, upon heating of the brake.

20. A brake comprising a drum, a friction device therein, automatic adjustment mechanism for said friction device and means of high thermo sensitivity associated with said adjustment mechanism for modifying the actuation thereof due to drum heat expansion.

21. A brake comprising a drum, a friction device therein having an automatic adjustment, and thermo sensitive means associated therewith for preventing the actuation of said adjustment due to drum heat expansion.

22. A brake comprising an automatic adjustment mechanism, and thermo sensitive means for rendering said mechanism inoperative.

23. In a brake, a backing plate, a drum, a braking device for frictionally engaging the drum, a brake anchor rigidly mounted on the backing plate, a lever pivotally mounted on the anchor and having its free end extending through and movable in a slot in the backing plate whereby said lever may be pivoted from the outer side of the backing plate, and means responsive to pivoting of the lever to move the braking device into frictional engagement with the drum.

24. In a brake, a drum, a rigid anchor pin, a lever pivotally mounted on the anchor pin, a braking device for frictionally engaging the drum, said device having its ends disconnected from the anchor pin with one of said ends bearing against said pin at all times, and connections between the other end of the braking device and lever.

25. In a brake, a drum, a braking device for frictionally engaging the drum, a rigid brake anchor, a lever pivotally mounted on the anchor, and connections between the braking device and lever including a ball and socket joint, one element of said joint being carried by the lever.

26. In a brake, a drum, a braking device for frictionally engaging the drum, a brake applying lever, and an automatic slack adjuster for the braking device including a ratchet wheel and cooperating pawl, and further including a ball and socket joint one element of which is carried by the lever and the other embodied in the ratchet wheel.

27. An internal expanding brake comprising in combination a drum, a backing plate, an anchor pin, a brake applying lever pivotally mounted on said pin and having its free end extending through and movable in a slot in said plate, a ball secured to said lever, a brake element for frictionally engaging the drum and anchoring at one end on said pin, and an automatically extensible compression device having an axial socket at one end receiving said ball and having its other end connected to said element.

28. An internal expanding brake including a drum, a braking device for frictionally engaging the drum, a brake applying lever, a ball secured to said lever, a ratchet wheel having a socket receiving said ball, and an adjusting screw operated by said ratchet wheel and controlling its angular movement, the linear movement of said ratchet wheel partaking of the movement of the ball regardless of the adjustment of said screw.

29. In a brake, a drum, a braking device for frictionally engaging the drum, a brake applying lever, a link between the lever and braking device, said link including sections threaded one in the other, one of said sections being pivotally connected to the braking device, a ratchet wheel fixed on the outer end of the other section, means pivotally connecting the ratchet wheel with the lever, said means comprising a ball on the lever and an axial socket in the outer end of the ratchet wheel receiving said ball, and a pawl cooperating with the ratchet wheel.

30. In a brake, a drum, a braking device for frictionally engaging the drum, a brake applying lever, a link between the lever and braking device, said link including sections threaded one in the other, one of said sections being pivotally connected to the braking device, a ratchet wheel fixed on the other section, means pivotally connecting the ratchet wheel with the lever, and a pawl mounted on a fixed part of the brake for cooperation with the ratchet wheel.

31. In a brake, a drum, a braking device for frictionally engaging the drum, a brake applying lever, a slack adjuster for the braking device including a ratchet wheel and cooperating pawl mounted on a fixed part of the brake, the surface of the pawl which contacts with the ratchet wheel moving longitudinally of the latter as said pawl is pivoted, and means for effecting pivotal movement of the pawl.

GEORGE L. SMITH.